United States Patent
Kawaguchi et al.

(10) Patent No.: US 9,231,424 B2
(45) Date of Patent: Jan. 5, 2016

(54) CHARGING SYSTEM

(75) Inventors: Yuki Kawaguchi, Tokyo (JP); Takae Shimada, Tokyo (JP); Satoshi Asano, Tokyo (JP); Akihiko Kanouda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 14/115,208

(22) PCT Filed: May 25, 2011

(86) PCT No.: PCT/JP2011/061943
§ 371 (c)(1),
(2), (4) Date: Nov. 1, 2013

(87) PCT Pub. No.: WO2012/160660
PCT Pub. Date: Nov. 29, 2012

(65) Prior Publication Data
US 2014/0084862 A1 Mar. 27, 2014

(51) Int. Cl.
*H02J 7/00* (2006.01)
*H02J 7/02* (2006.01)
(Continued)

(52) U.S. Cl.
CPC ............ *H02J 7/0052* (2013.01); *B60L 11/005* (2013.01); *B60L 11/182* (2013.01); *B60L 11/1816* (2013.01); *B60L 11/1833* (2013.01);
(Continued)

(58) Field of Classification Search
CPC ............ H02J 5/005; H02J 17/00; H02J 7/025
USPC ........................................................ 320/108
See application file for complete search history.

(56) References Cited

U.S. PATENT DOCUMENTS

| | | | |
|---|---|---|---|
| 5,821,731 A | * | 10/1998 | Kuki et al. .................... 320/108 |
| 2005/0178632 A1 | | 8/2005 | Ross |

(Continued)

FOREIGN PATENT DOCUMENTS

| | | |
|---|---|---|
| CN | 101272059 A | 9/2008 |
| CN | 101277069 A | 10/2008 |

(Continued)

OTHER PUBLICATIONS

Japanese Office Action dated Mar. 17, 2015 with English translation (12 pages).

(Continued)

*Primary Examiner* — Suchin Parihar
(74) *Attorney, Agent, or Firm* — Crowell & Moring LLP

(57) ABSTRACT

Disclosed is a charging system for both plug-in charging systems and contactless charging systems, having a simple electrical configuration, and capable of achieving miniaturization and weight saving. The charging system includes a secondary cell charged via first/second coils of a transformer to which electrical power is supplied from a first power supply via a plug-in connector, and a third coil supplied with electrical power from a second power supply, a relative position of which to the second coil of the transformer is variable, and which can be magnetically coupled to the second coil when the second coil approaches the third coil, wherein the secondary cell is charged via magnetic coupling between first/second coils when charging the secondary cell by the first power supply, and the secondary cell is charged via magnetic coupling between the third coil and second coils when charging the secondary cell by the second power supply.

22 Claims, 11 Drawing Sheets

(51) Int. Cl.
*B60L 11/00* (2006.01)
*B60L 11/18* (2006.01)

(52) U.S. Cl.
CPC .......... *B60L11/1846* (2013.01); *H02J 7/0055* (2013.01); *H02J 7/025* (2013.01); *B60L 2210/20* (2013.01); *B60L 2210/30* (2013.01); *B60L 2210/40* (2013.01); *Y02T 10/7005* (2013.01); *Y02T 10/7022* (2013.01); *Y02T 10/725* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2008/0231236 A1 | 9/2008 | Watanabe et al. |
| 2010/0097830 A1 | 4/2010 | Wang |
| 2010/0235006 A1* | 9/2010 | Brown .......................... 700/286 |
| 2011/0074351 A1* | 3/2011 | Bianco et al. ................. 320/109 |
| 2011/0196545 A1* | 8/2011 | Miwa .......................... 700/292 |
| 2011/0204845 A1* | 8/2011 | Paparo et al. ................. 320/108 |
| 2012/0043807 A1 | 2/2012 | Ichikawa |
| 2012/0306439 A1 | 12/2012 | Ichikawa et al. |
| 2013/0193918 A1* | 8/2013 | Sarkar et al. ................. 320/109 |
| 2014/0067660 A1* | 3/2014 | Cornish .......................... 705/39 |

FOREIGN PATENT DOCUMENTS

| | | |
|---|---|---|
| CN | 201616696 U | 10/2010 |
| JP | 10-136588 A | 5/1998 |
| JP | 11-252810 A | 9/1999 |
| JP | 2003-204637 A | 7/2003 |
| JP | 2003-219582 A | 7/2003 |
| JP | 2009-101884 A | 5/2009 |
| JP | 2010-213535 A | 9/2010 |
| JP | 2010-273441 A | 12/2010 |
| WO | WO 2010/131348 A1 | 11/2010 |
| WO | WO 2010/131349 A1 | 11/2010 |

OTHER PUBLICATIONS

Chinese Office Action dated Apr. 13, 2015 with English translation (18 pages).

Corresponding International Search Report with English Translation dated Aug. 16, 2011 (five (5) pages).

* cited by examiner

CHARGING SYSTEM

TECHNICAL FIELD

The present invention relates to a charging system for performing charging of a secondary cell or a capacitor in a device having the secondary cell or the capacitor as a drive source such as an electric vehicle.

BACKGROUND ART

In the past, a variety of types of charging system for charging the secondary cell of, for example, an electric vehicle have been developed. Among these systems, as a typical charging system, there can be cited a charging system mounted on a vehicle and performing charging while being connected to a power supply using a plug. Hereinafter, this charging system is referred to as a "plug-in charging system." The plug-in systems can be divided into normal charging devices and fast charging device having a larger power capacity than in the normal charge depending on the power capacity.

In PTL 1, a core and a coil on the secondary side of an isolation transformer and a rectifier circuit are used in common by a normal charging circuit and a fast charging circuit to thereby achieve miniaturization and cost reduction of the charging device while corresponding with both of the normal charging system and the fast charging system. In the case of this plug-in system, although charge can be performed in any place where a power supply is provided, since the operator is required to connect the plug and the power supply to each other when performing the charge, there is a problem that the operation becomes troublesome. In particular, in PTL1, there is required the operation of mounting a dummy core to a detachable transformer section when performing the normal charge, and detaching the dummy core and then mounting a fast charging paddle (provided with a primary coil and a detachable core) when performing the fast charge.

In contrast, in recent years, there has been proposed a charging system, which performs the charge in a contactless manner without requiring to connect the plug and the power supply to each other when performing the charge. Hereinafter, this charging system is referred to as a "contactless charging system." However, since the contactless charging system uses a complicated device, and requires a dedicated charging device, there is a problem that the charging place is restricted compared to the plug-in charging system.

As a charging system for solving the problem, PTL 2 has been disclosed. In this charging system, there is disclosed a charging system corresponding with both of the plug-in charging system and the contactless charging system in a first embodiment shown in FIG. 1 of PTL 2. In an embodiment shown in FIG. 2 of PTL 2, both of the two systems are contactless charging systems, and in an embodiment shown in FIGS. 3 through 5, both of the two systems are plug-in charging systems. According to the first embodiment shown in FIG. 1 of PTL 2, a plug-in charging circuit and a contactless charging circuit are provided to thereby achieve enhancement of the convenience so that the charge can be performed using either of the charging devices.

CITATION LIST

Patent Literature

PTL 1: JP-A-2010-213535
PTL 2: JP-A-11-252810

SUMMARY OF INVENTION

Technical Problem

The technology described in PTL 1 corresponds with both of the normal charging system and the fast charging system, and at the same time achieves miniaturization and cost reduction of the charging device. However, the charging system of PTL 1 does not correspond with the contactless charging system, and has a problem that it is not only required for the operator to connect the plug and the power supply to each other when performing the charge, but also required to perform the cumbersome operation of replacing the detachable transformer section.

The technology described in the first embodiment of PTL 2 can correspond with both of the plug-in charging system and the contactless charging system, but requires transformers respectively in the plug-in charging circuit and the contactless charging circuit, and further, has the circuits for the respective two systems configured independently, and thus, there is a problem that the charging device grows in size and cost.

An object of the present invention is to enhance the convenience of the user in a charging system capable of performing the charge using either of the plug-in charging system and the contactless charging system.

A preferable embodiment of the present invention has an object of simplifying the configuration by achieving shared use of an electric circuit between the two charging systems to thereby achieve miniaturization and cost reduction of the device.

Solution to Problem

The present invention is characterized in one aspect thereof by including one of a secondary cell and a capacitor to be charged via first/second coils of a transformer supplied with electrical power from a first power supply via a wired (plug-in) connector, and a third coil, which is supplied with electrical power from a second power supply, a relative position of which to the second coil of the transformer is variable, and which can be magnetically coupled to the second coil when the second coil approaches to the third coil, wherein in a case of charging one of the secondary cell and the capacitor by the first power supply, the charging power is supplied to one of the secondary cell and the capacitor via the magnetic coupling of the first/second coils, and in a case of charging the secondary cell by the second power supply, the charging power is supplied to the secondary cell via the magnetic coupling between the third coil and the second coil.

In a preferable aspect of the present invention, there is provided an AC-AC converter connected between the first power supply and the first coil of the transformer, and the wired connector is disposed so as to establish and block connection between the first power supply and the AC-AC converter.

Further, in a specific aspect of the present invention, the transformer including the first and second coils, and one of the secondary cell and the capacitor are mounted on a vehicle, the first power supply adapted to supply the first coil with the electrical power is disposed in a first charging site on a ground, the second power supply and the third coil are disposed in a second charging site on the ground, and the charging system is configured so that the connection between the first power supply and the first coil can be established using the wired connector in a case in which the vehicle stops at a predetermined position in the first charging site, and the third coil and the second coil can be magnetically coupled to each other in a case in which the vehicle stops at a predetermined position in the second charging site.

Advantageous Effects of Invention

According to a preferable aspect of the present invention, by moving the equipment provided with the secondary cell or a capacitor to the two predetermined positions, the plug-in charging circuit and the contactless charging circuit can respectively be constituted, and thus the charging system enhancing the convenience of the user can be configured.

Further, according to a preferable aspect of the present invention, the circuit posterior to the secondary section of the transformer can be used in common by the plug-in charging circuit and the contactless charging circuit, and thus, miniaturization and cost reduction of the charging system can be achieved.

DESCRIPTION OF EMBODIMENTS

Hereinafter, preferred embodiments of the present invention will be explained in detail with reference to the drawings.

EXAMPLE 1

Figure 1:
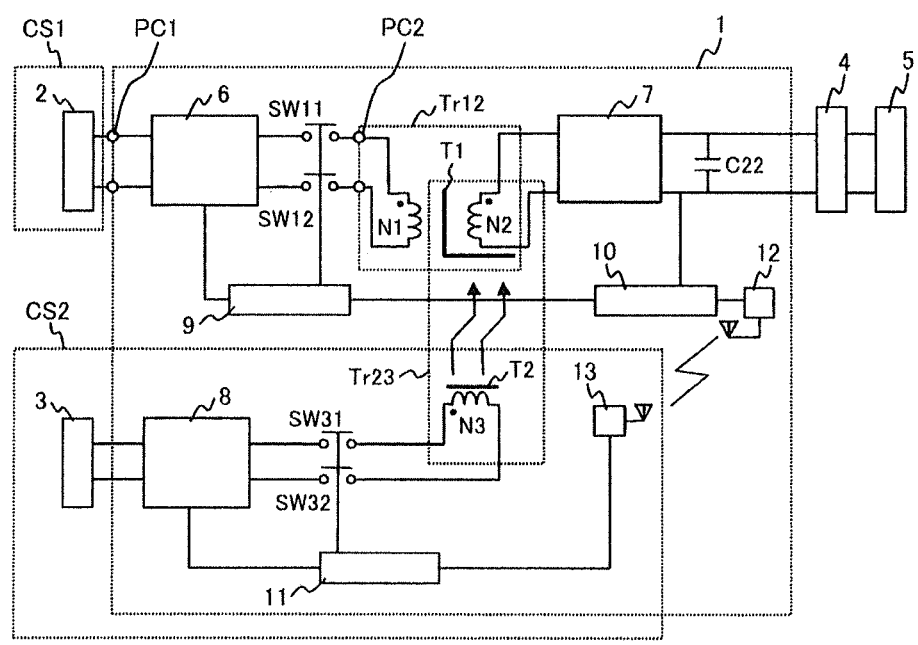
FIG. 1 is a schematic circuit configuration diagram of a charging system according to Example 1 of the present invention.
Figure 2:
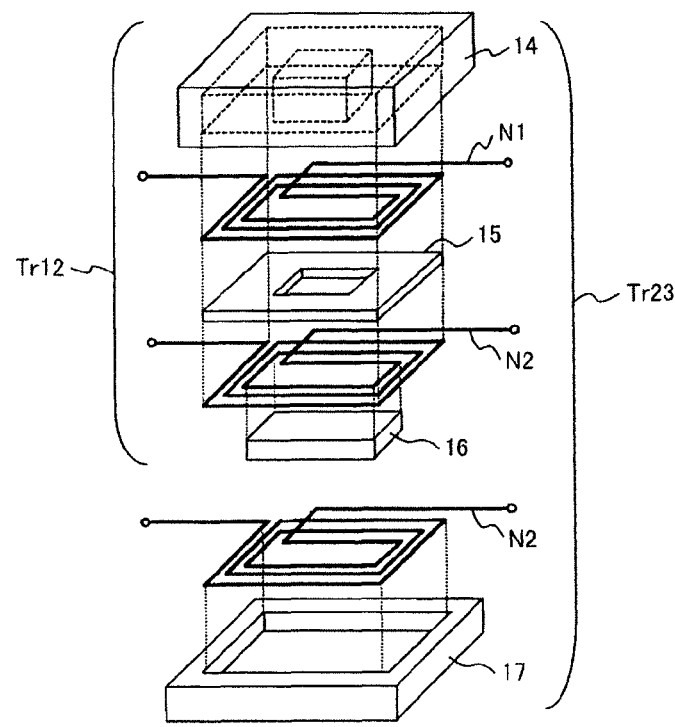
FIG. 2 is an exploded perspective view for explaining a configuration of the first embodiment of an isolation transformer, which can be adopted in the present invention.
Figure 3:
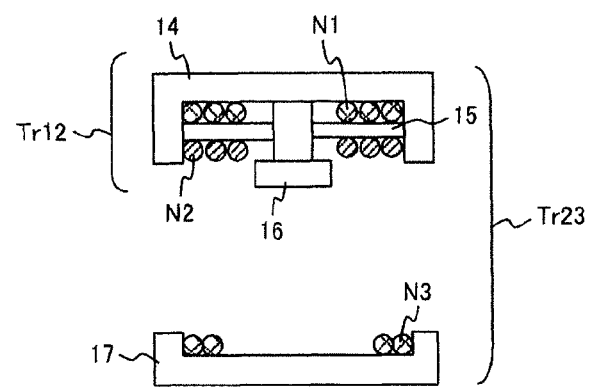
FIG. 3 is a cross-sectional view for explaining a coil configuration of the first embodiment of the isolation transformer similarly to FIG. 2.

Example 1 of the present invention will be explained using FIGS. 1 through 3. FIG. 1 is a schematic circuit configuration diagram of a charging system according to Example 1 of the present invention. The charging device 1 is connected between a power supply 2 and a power supply 3, and a secondary cell 4 connected to a load 5, and is capable of charging the secondary cell 4 by the power supply 2 using the plug-in charge, or by the power supply 3 using the contactless charge. Hereinafter, the explanation will be forwarded while exemplifying a charging system for an in-vehicle secondary cell of an electric vehicle.

For the plug-in charge in a first charging site CS1, the charging device 1 is provided with a plug-in charging primary circuit 6, switches SW11, SW12, an isolation transformer Tr12 (coils N1, N2), a charging secondary circuit 7, and a smoothing capacitor C22, and is further provided with control means 9, 10, and a transceiver 12. The isolation transformer Tr12 provides magnetic coupling of the coils N1, N2 using a core T1. In the case of the electric vehicle, these circuits, the secondary cell 4, and the load 5 are mounted on the vehicle.

It is arranged that a plug-in connector PC1 can establish or block the connection between the power supply 2 constituting the first charging site CS1 and the plug-in charging primary circuit 6. It should be noted that the plug-in connector can be one to be disposed at the position indicated by the reference symbol PC2 shown in the drawing. The plug-in charging primary circuit 6 and the switches SW11, SW12 are controlled by the control means 9 and the control means 10.

On the other hand, a second charging site CS2 is provided for the contactless charge, and the second charging site CS2 is provided with a contactless charging primary circuit 8, switches SW31, SW32, some parts (a core T2, a coil N3) of an isolation transformer Tr23, control means 11, and a transceiver 13. The contactless charging primary circuit 8 and the switches SW31, SW32 are controlled by the control means 11. The control means 10 and the control means 11 are wirelessly connected to each other by the transceiver 12 mounted on the vehicle and the transceiver 13 of the second charging site CS2.

When the electric vehicle is parked at a predetermined position in the second charging site CS2, the isolation transformer Tr23 establishes the magnetic coupling between the coil N3 of the charging site CS2 and the coil N2 mounted on the vehicle using the cores T1, T2 to make it possible to transmit the power for the contactless charge from the coil N3 to the coil N2.

Although the power supply 2 and the power supply 3 can be the same power supply in a general application, in the case of the application to the charging system for the electric vehicle, the power supply 2 of the first charging site CS1 and the second charging site CS2 including the second power supply 3 are installed in places distant from each other.

Further, although the configuration of connecting the secondary cell 4 between the charging device 1 and the load 5 is adopted in Example 1, it is also possible to adopt a configuration of connecting a capacitor such as an electric double layer capacitor or a lithium-ion capacitor between the charging device 1 and the load 5.

Then, a configuration shown in FIGS. 2 and 3 will be explained. FIGS. 2 and 3 are an exploded perspective view and a cross-sectional view, respectively, showing a configuration of a first embodiment of the isolation transformer Tr12 and the contactless charging transformer Tr23 in Example 1 of the present invention.

A core 14 is a square ferrite core, and has a prismatic leg disposed in a central portion and also a leg disposed in the peripheral portion, and has a shape having a recess shaped like a doughnut inside when viewed from the opening. The coil N1 is spirally wound in the recessed portion centered on the center leg of the core 14 to form the primary section of the transformer Tr12. The coil N2 is wound around the core 14 so as to overlap the coil N1 to form the secondary section of the isolation transformer Tr12 and the secondary section of the contactless charging transformer Tr23. Between the coil N1 and the coil N2, there is inserted an insulating member 15 in order to keep the insulation between the coils, and the center leg of the core 14 is provided with a core head 16 in order to enhance the magnetic coupling between the coil N1 and the coil N2.

A core 17 is a square ferrite core, and has a shape having a leg only in the peripheral portion of the core. A coil N3 is spirally wound in the recessed portion of the core 17 to form the primary section of the contactless charging transformer Tr23.

It should be noted that although not shown, when winding and then fixing the coils N1 through N3, bobbins can also be used. Although an enamel wire (a solid wire) is used for the coils N1 through N3, a litz wire can also be used. Further, although the square shape is adopted as the shapes of the cores 14, 17, and the coils N1 through N3 in Example 1, a circular shape or a triangular shape can also be adopted. Regarding the core material, other magnetic materials such as amorphous or a silicon steel plate can also be used. Further, although the core 14 and the core 17 are made to have different shapes from each other in Example 1, they can also be made to have the same shape.

(Explanation of Operation)

The charging operation in the charging device 1 configured as described above will be explained.

In the present specification, an operation of charging the secondary cell 4 by the power supply 2 via the plug-in charging primary circuit 6, the isolation transformer Tr12, and the charging secondary circuit 7 is referred to as plug-in charge. Further, an operation of charging the secondary cell 4 by the power supply 3 via the contactless charging primary circuit 8, the contactless charging transformer Tr23, and the charging secondary circuit 7 is referred to as contactless charge.

(Plug-in Charging Operation)

The plug-in charging operation of the charging device 1 according to Example 1 will be explained.

When performing the plug-in charge, the switches SW11, SW12 are kept in the ON state, and the switches SW31, SW32 are kept in the OFF state. By setting the switches SW31, SW32 to the OFF state, an influence on the contactless charging primary circuit 8 is eliminated.

It should be noted that in the case of the application to the charging system such as the electric vehicle, the vehicle is stopped at a predetermined position in the first charging site CS1, and then connection between the power supply 2 on the ground and the plug-in charging primary circuit 6 mounted on the vehicle is established with the plug-in connector PC1. On this occasion, the second charging site CS2 does not exist in the neighborhood.

The control means 10 detects the state of the secondary cell 4 and the load 5, then determines a command value of the plug-in charging primary circuit 6, and then transmits the command value to the control means 9. In accordance with the command value received from the control means 10, the control means 9 makes the plug-in charging primary circuit 6 perform a switching operation to thereby apply an alternating-current voltage to the coil N1. The charging secondary circuit 7 rectifies an inductive voltage generated in the coil N2 and then smoothes the inductive voltage with the smoothing capacitor C22, and then charges the secondary cell 4.

(Contactless Charging Operation)

Then, the contactless charging operation of the charging device 1 according to Example 1 will be explained.

When performing the contactless charge in the electric vehicle, firstly, by stopping the vehicle at a predetermined position in the contactless charging site CS2, which is the second charging site, the core T1 and the coil N2 of the isolation transformer Tri2 are made to approach the core T2 and the coil N3 in the second charging site CS2 to thereby magnetically couple the coil N3 and the coil N2 each other.

Further, when performing the contactless charge, the switches SW11, SW12 are kept in the OFF state, and the switches SW31, SW32 are kept in the ON state. By setting the switches SW11, SW12 to the OFF state, an influence on the plug-in charging primary circuit 6 is eliminated.

The control means 10 detects the state of the secondary cell 4 and the load 5, then determines a command value to the contactless charging primary circuit 8, and then transmits the command value to the control means 11 via the transceiver 12 and the transceiver 13. In accordance with the command value received from the control means 10, the control means 11 makes the contactless charging primary circuit 8 perform a switching operation to thereby apply an alternating-current voltage to the primary coil N3 of the isolation transformer Tr23. The charging secondary circuit 7 rectifies a voltage generated in the secondary coil N2, and then charges the secondary cell 4 via the smoothing capacitor C22. On this occasion, the control means 10 determines the command value of the contactless charging primary circuit 8 and the switching operation of the contactless charging primary circuit 8.

Although the configuration of disposing the switches SW11, SW12 between the plug-in charging primary circuit 6 and the coil N1, and disposing the switches SW31, SW32 between the contactless charging primary circuit 8 and the coil N2 is adopted in Example 1, these switches can also be eliminated. Further, the transceivers 12, 13 can be provided with a function of detecting a position between the primary side and the secondary side of the isolation transformer Tr23 for the contactless charge, and then transmitting the fact that the normal magnetic coupling state has been established.

According to Example 1, by moving the electric vehicle or a device provided with the secondary cell 4 to the two predetermined positions, the plug-in charging circuit and the contactless charging circuit can respectively be constituted, and thus the convenience of the user can be enhanced.

Further, the circuit posterior to the secondary side of the isolation transformer, namely the core T1 and the secondary coil N2 of the isolation transformer, the charging secondary circuit 7, the smoothing capacitor C22, and the control means 10 can be used in common by the plug-in charging circuit and the contactless charging circuit, and thus, miniaturization and cost reduction of the secondary cell charging system can be achieved.

Figure 4:
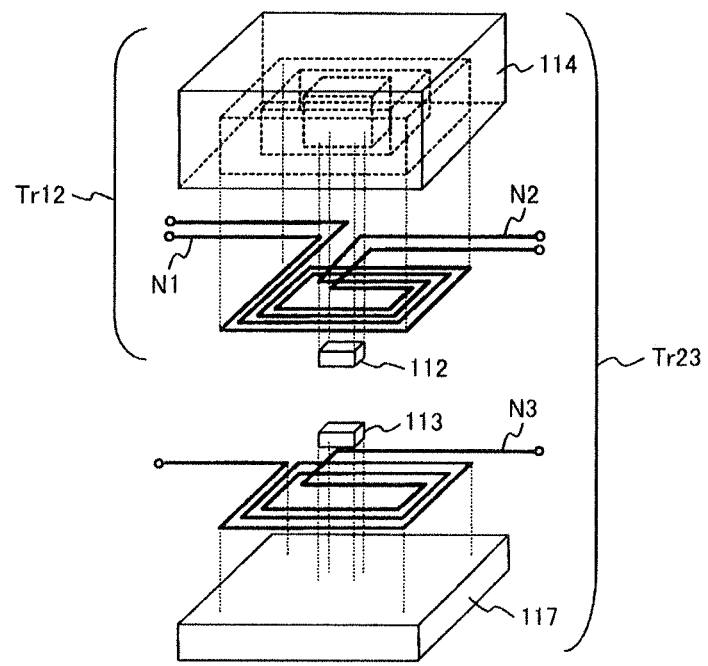
FIG. 4 is an exploded perspective view for explaining a second embodiment of the isolation transformer, which can be adopted in the present invention.
Figure 5:
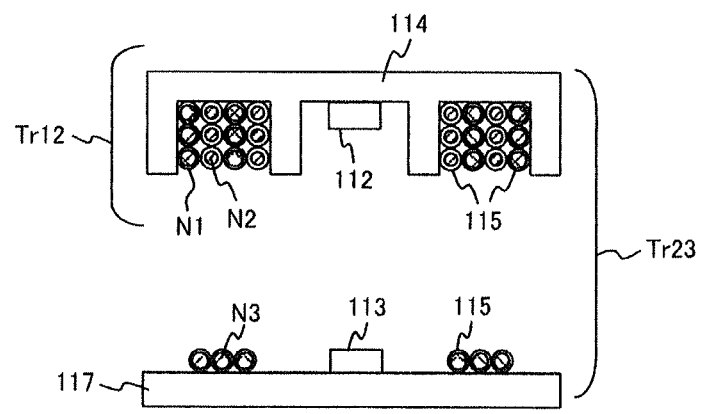
FIG. 5 is a cross-sectional view for explaining a coil configuration of the second embodiment of the isolation transformer similarly to FIG. 4.

Then, a second embodiment of the isolation transformer according to the present invention will be explained using FIGS. 4 and 5. FIGS. 4 and 5 are an exploded perspective view for explaining a configuration of the second embodiment of the isolation transformer of the present invention, and a cross-sectional view for explaining a coil configuration.

A core 114 is a square ferrite core, and has a prismatic leg disposed in a central portion and a leg disposed in the peripheral portion, and has a shape having a recess shaped like a doughnut inside when viewed from the opening. The leg in the central portion has a shape recessed in the center thereof. The coil N1 and the coil N2 are wound spirally in a recessed portion between the leg in the central portion of the core 114 and the leg on the periphery in an overlapping manner, and the coil N1 forms the primary section of the isolation transformer Tr12, and the coil N2 forms the secondary section of the isolation transformer 1 and the secondary section of the transformer Tr23 for the contactless charge.

The core 117 is a square flat ferrite core. The coil N3 is spirally wound on one side of the core 117 to form the primary section of the contactless charging transformer Tr23.

The transceiver 112 is disposed in the recessed portion of the leg in the central portion of the core 114, and the transceiver 113 is disposed at the central portion of the core 117. According to the present embodiment of the isolation transformer, since the core and the transceiver can be made to have an integral configuration, miniaturization of the charging device can be achieved.

Figure 6:
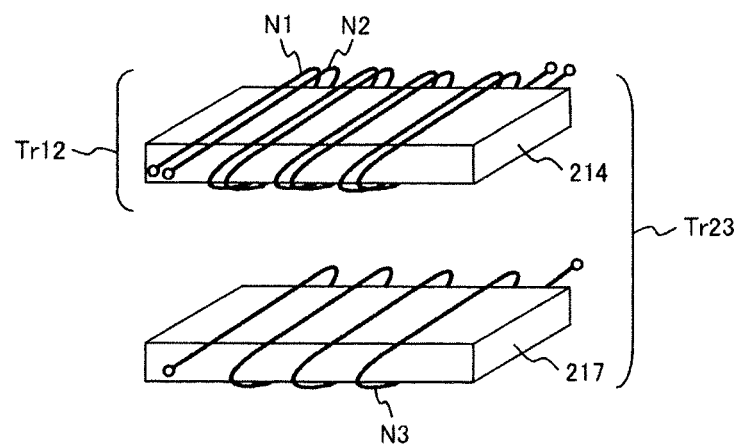
FIG. 6 is an exploded perspective view for explaining a configuration of a third embodiment of the isolation transformer, which can be adopted in the present invention.

Then, a third embodiment of the isolation transformer, which can be adopted in the present invention, will be explained using FIGS. 6 and 7. FIG. 6 is an exploded perspective view for explaining a configuration of a third embodiment of the isolation transformer according to the present invention. A core 214 and a core 217 are both square flat ferrite cores, and the coil N1 and the coil N2 are wound around the core 214 in a bundled manner, and the coil N1 forms the primary section of the isolation transformer Tr12, and the coil N2 forms the secondary section of the isolation transformer Tr12 and the secondary section of the contactless charging transformer Tr23. The coil N3 is wound around the core 217 to form the primary section of the contactless charging transformer Tr23.

Figure 7:
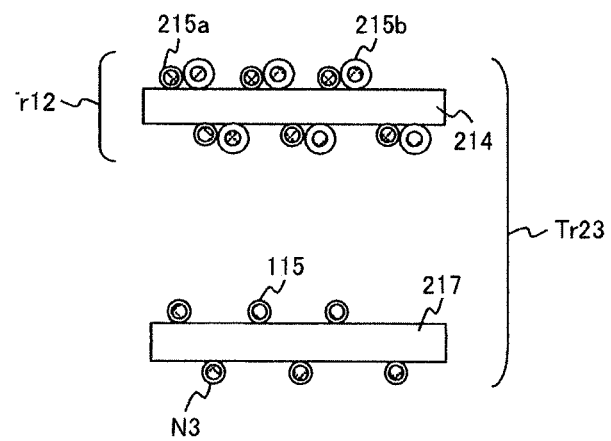
FIG. 7 is a cross-sectional view for explaining a coil configuration of the third embodiment of the isolation transformer similarly to FIG. 6.

FIG. 7 is a cross-sectional view of the isolation transformer Tr12 and the contactless charging transformer Tr23 according to the third embodiment similarly applicable to the present invention. The surfaces of the coil N1, the coil N2, and the coil N3 are covered by an insulating body 215 to thereby ensure the insulation between the primary and secondary sections of the isolation transformer Tr12. Regarding the parasitic capacitance between the primary and secondary sections, reduction can be achieved by using an insulating body with a low-dielectric constant. It should be noted that in the case in which the currents respectively flowing through the coil N1 and the coil N2 are significantly different from each other, by increasing only the thickness of the insulating body 215a of the coil on the smaller current side while decreasing the thickness of the insulating body 215b of the coil on the larger current side, the heat radiation property of the coils can be improved while ensuring the insulation between the primary and secondary sections of the isolation transformer 1.

It should be noted that two cores different in size from each other can be used as the cores T1 and T2.

According to the configuration of the present invention, since the isolation transformer can be configured with a simple structure, cost reduction of the charging device can be realized.

EXAMPLE 2

Figure 8:
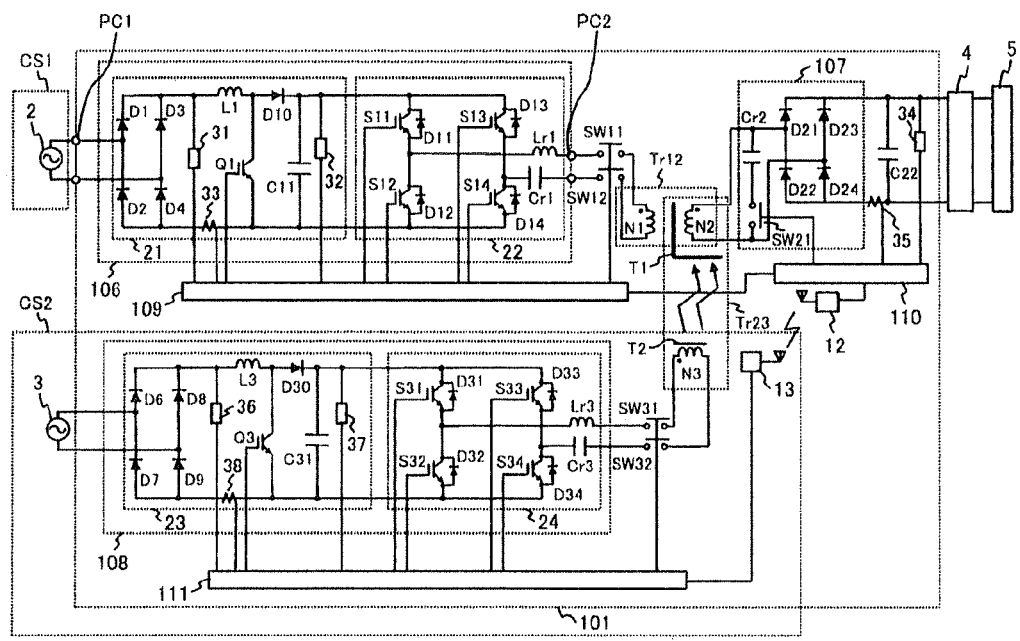
FIG. 8 is a specific circuit configuration diagram of a charging system according to Example 2 of the present invention.

FIG. 8 is a specific circuit configuration diagram of a secondary cell charging system according to Example 2 of the present invention. A charging device 101 is connected between an alternating-current power supply 2 and an alternating-current power supply 3, and the secondary cell 4, and is capable of charging the secondary cell 4 by the alternating-current power supply 2 using the plug-in charge, or by the alternating-current power supply 3 using the contactless charge.

Although the charging device 101 is basically the same as the example shown in FIG. 1, each of the circuits is more specifically shown in the drawing. The parts duplicate with those explained with reference to FIG. 1 will be omitted from the explanation.

For the plug-in charge in the first charging site CS1, the charging device 101 is provided with a plug-in charging primary circuit 106, the switches SW11, SW12, the isolation transformer Tr12 (the coils N1, N2), a charging secondary circuit 107, and the smoothing capacitor C22, and is further provided with control means 109, 110, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 106. It should be noted that similarly to Example 1, one provided with the plug-in primary circuit 106 in the first charging site CS1, and disposing the plug-in connector at the position indicated by the reference symbol PC2 shown in the drawing can also be adopted. The plug-in charging primary circuit 106 and the switches SW11, SW12 are controlled by the control means 109 and the control means 110 coordinating with each other.

On the other hand, the second charging site CS2 is provided for the contactless charge, and the second charging site CS2 is provided with the second power supply 3, a contactless charging primary circuit 108, the switches SW31, SW32, some parts (the core T2, the coil N3) of the isolation transformer Tr23, control means 111, and the transceiver 13.

The plug-in charging primary circuit 106 is provided with an AC-DC converter 21, to which the power of the alternating-current power supply 2 is input through the plug-in connector PC1, and which outputs a direct-current link voltage, and a DC-AC inverter 22 for supplying the coil N1 with an alternating current derived from the link voltage.

In the AC-DC converter 21, full-wave rectification of the voltage of the alternating-current power supply 2 is performed by rectifier diodes D1 through D4 bridge-connected to each other. The full-wave-rectified voltage is input to a step-up chopper composed of a step-up inductor L1, a step-up switching element Q1, a step-up diode D10, and a direct-current link capacitor C11.

The DC-AC inverter 22 is provided with switching elements S11 through S14 full-bridge-connected to each other, a resonant capacitor Cr1 to be connected in series to the coil N1, and a resonant inductor Lr1. To the switching elements S11 through S14, there are connected antiparallel diodes D11 through D14, respectively. The switching element Q1, the switching elements S11 through S14, and the switches SW11, SW12 are controlled by the control means 109 and the control means 110. To the control means 109, there are connected a voltage sensor 31 for detecting an input voltage, a voltage sensor 32 for detecting the link voltage, a current sensor 33 for detecting an input current from the alternating-current power supply 2, and the control means 110.

The charging secondary circuit 107 is provided with a resonant capacitor Cr2 connected in parallel to the coil N2 and for compensating the leakage inductance of the coil N2, a switch SW21 for separating the resonant capacitor Cr2, diodes D21 through D24 bridge-connected to each other, and the smoothing capacitor C22. Further, the current induced in the coil N2 is rectified by the diodes D21 through D24 bridge-connected to each other, and the smoothing capacitor C22 and the secondary cell 4 are charged.

The resonant capacitor Cr2 is separated from the coil N2 by switching OFF the switch SW21 in the plug-in charging operation, or connected in parallel to the coil N2 by switching ON the switch SW21 in the contactless charging operation.

The contact less charging primary circuit 108 is provided with an AC-DC converter 23, to which the power of the second alternating-current power supply 3 is input, and which outputs a direct-current link voltage, and a DC-AC inverter 24 for supplying the coil N3 with an alternating current derived from the link voltage.

In the AC-DC converter 23, full-wave rectification of the voltage of the alternating-current power supply 3 is performed by rectifier diodes D6 through D9 bridge-connected to each other. The full-wave-rectified voltage is input to a step-up chopper composed of a step-up inductor L3, a step-up switching element Q3, a step-up diode D30, and a direct-current link capacitor C31.

The DC-AC inverter 24 is provided with switching elements S31 through S34 full-bridge-connected to each other, a resonant capacitor Cr3 to be connected in series to the coil N3 and compensating the leakage inductance of the coil N3, and a resonant inductor Lr3. To the switching elements S31 through S34, there are connected antiparallel diodes D31 through D34, respectively.

To the control means 110, there are connected a voltage sensor 34 for detecting the voltage of the secondary cell 4, namely the output voltage, a current sensor 35 for detecting an output current to the secondary cell 4, and the transceiver 12.

The switching element Q3 in the contactless charging primary circuit 108, the switching elements S31 through S34, and the switches SW31, SW32 are controlled by the control means 110 and the control means 111 coordinating with each other. To the control means 111, there are connected a voltage sensor 36 for detecting an input voltage, a voltage sensor 37 for detecting the link voltage, a current sensor 38 for detecting an input current from the alternating-current power supply 3, and the transceiver 13.

It should be noted that although in Example 2 it is assumed that the power supplies 2, 3 are the alternating-current power supplies, direct-current power supplies can also be adopted. In the case of assuming that the power supplies 2, 3 are the direct-current power supplies, it is possible to adopt a configuration of connecting the DC-AC inverters 22, 24 to the direct-current power supplies via the direct-current link capacitors C11, C31 without the intervention of the AC-DC converter 21 of the plug-in charging primary circuit 106 and the AC-DC converter 23 of the contactless charging primary circuit 108.

The step-up choppers in the AC-DC converters 21, 23 are controlled using PWM control, and the DC-AC inverters 22, 24 are controlled using PWM control, phase-shift control, or frequency control.

In the case of using MOSFET as the switching elements S11 through S14, and S 31 through D34, the parasitic diode of the MOSFET as the antiparallel diode can be used.

(Explanation of Circuit Operation)

Hereinafter, the circuit operation of the charging device 101 according to Example 2 will be explained.

(Plug-in Charging Operation)

Figure 9:
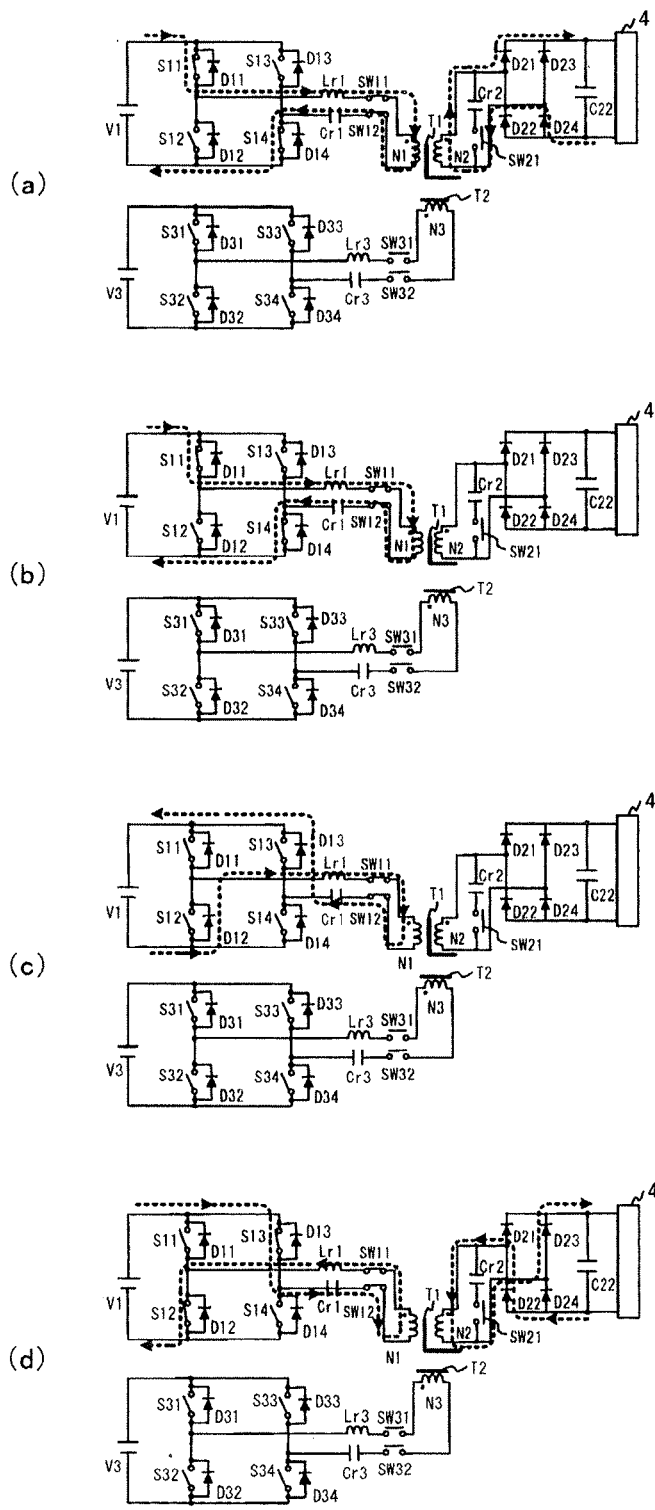
FIG. 9 are diagrams for explaining a plug-in charging operation according to Example 2 of the present invention.

FIG. 9 are circuit diagrams for explaining the plug-in charging operation of the charging device 101 according to Example 2. In FIG. 9, the first alternating-current power supply 2 and the AC-DC converter 21 shown in FIG. 8 are expressed as a direct-current power supply V1. Hereinafter, the plug-in charging operation will be explained in detail with reference to FIG. 9. It should be noted that FIGS. 9($a$) through 9($d$) show modes a through d, respectively.

(Mode a)

Firstly, in the mode a, the switching elements S11, S14 are in the ON state. The resonant current due to the resonant capacitor Cr1 and the resonant inductor Lr1 flows from the power supply V1 to the coil N1. On this occasion, the current flows through the coil N2 in a loop composed of the diode D24, the coil N2, and the diode D21 to thereby charge the smoothing capacitor C22 and the secondary cell 4.

(Mode b)

When the charging of the resonant capacitor Cr1 is completed and the resonant current of the resonant capacitor Cr1 and the resonant inductor Lr1 finishes flowing in the state of the mode a, the state of the mode b occurs. In the state of the mode b, the excitation current of the transformer flows alone through the coil N1. Since the voltage of the coil N2 is lower than the voltage of the smoothing capacitor C22, no current is flowing through the coil N2.

(Mode c)

When turning off the switching elements S11, S14 in the state of the mode b, the state of the mode c occurs. In the mode c, the current having been flowing through the switching element flows through the diode, and then flows to the power supply V1. On this occasion, the switching elements S12, S13 have previously been switched ON. Since the voltage of the coil N2 is lower than the voltage of the smoothing capacitor C22, no current is flowing through the coil N2.

(Mode d)

When the current of the coil N1 is reversed, the state of the mode d occurs. The mode d is a symmetrical operation of the mode a. Thereafter, the state returns to the mode a after symmetrical operations of the mode b and the mode c.

(Contactless Charging Operation)

Figure 10:
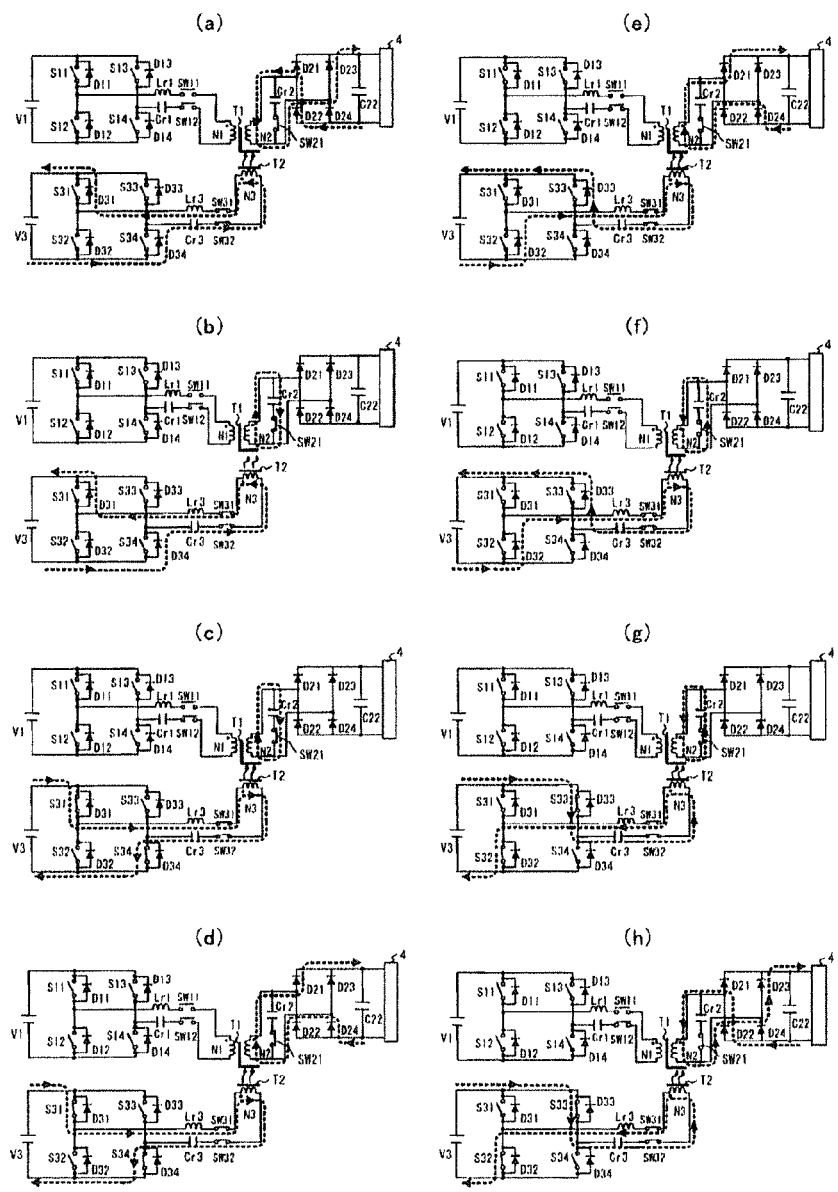
FIG. 10 are diagrams for explaining a contactless charging operation according to Example 2 of the present invention.

FIG. 10 are circuit diagrams for explaining the contactless charging operation of the charging device 101 according to Example 2. In FIG. 10, the alternating-current power supply 3 and the AC-DC converter 23 shown in FIG. 8 are expressed as a direct-current power supply V3. Hereinafter, the contactless charging operation will be explained in detail with reference to FIG. 10. It should be noted that FIGS. 10($a$) through 10($h$) show modes a through h, respectively.

(Mode a)

Firstly, in the mode a, the switching elements S31 through S34 are in the OFF state, and the current is flowing in the loop composed of the diode D34, the resonant capacitor Cr3, the coil N3, and the resonant inductor Lr3. On this occasion, the current inducted in the coil N2 charges the smoothing capacitor C22 and the secondary cell 4 via the diodes D22, D23.

(Mode b)

In the mode b, the current of the coil N3 is flowing in the same loop as in the mode a. The current of the coil N2 is flowing only in the loop composed of the coil N2 and the resonant capacitor Cr2 due to the resonant phenomenon of the inductance of the coil N2 and the resonant capacitor Cr2.
(Mode c)

When the resonant current flowing through the coil N3 is reversed in the mode b, the state of the mode c occurs. In the mode c, the current is flowing from the power supply V3 in the loop composed of the switching element S31, the resonant inductor Lr3, the coil N3, the resonant capacitor Cr3, and the switching element 34. On this occasion, the current of the coil N2 is flowing only in the loop composed of the coil N2 and the resonant capacitor Cr2 similarly to the mode c.
(Mode d)

When the voltage of the resonant capacitor Cr2 reaches the voltage of the smoothing capacitor C22 in the state of the mode c, a transition to the mode d occurs. On this occasion, the current of the coil N3 is flowing in the same loop as in the mode c. The current induced in the coil N2 charges the smoothing capacitor C22 and the secondary cell 4 via the diodes D21, D24.
(Mode e)

When turning off the switching elements S31, S34 in the state of the mode d, the current having been flowing through the switching elements S31, S34 flows to the power supply 3 via the diodes D32, D33. The current inducted in the coil N2 charges the smoothing capacitor C22 and the secondary cell 4 via the diodes D21, D24 similarly to the mode d.
(Mode f)

In the mode f, the current of the coil N3 is flowing in the same loop as in the mode e. The current of the coil N2 is flowing only in the loop composed of the coil N2 and the resonant capacitor Cr2 due to the resonant phenomenon of the inductance of the coil N2 and the resonant capacitor Cr2. In this period, the switching elements S32, S33 are set to the ON state.
(Mode g)

When the current of the coil N3 is reversed in the state of the mode f, the mode g occurs. In the mode g, the current flows from the power supply V3 in the loop composed of the switching element S33, the resonant capacitor Cr3, the coil N3, the resonant inductor Lr3, and the switching element S32. The current of the coil N2 is flowing only in the loop composed of the coil N2 and the resonant capacitor Cr2 similarly to the mode f.
(Mode h)

When the voltage of the resonant capacitor Cr21 reaches the voltage of the smoothing capacitor C22 in the mode g, a transition to the mode h occurs. In the mode h, the current flows from the power supply V3 in the loop composed of the switching element S33, the resonant inductor Lr3, the coil N3, the resonant capacitor Cr3, and the switching element S32. On this occasion, the current induced in the coil N2 is flowing to the load via the diodes D32, D33.

When turning off the switching elements 533, S32 in the state of the mode h, a transition to the mode a occurs.

As described hereinabove, the operation modes of the plug-in charging operation and the contactless charging operation in the charging device 101 of Example 2 of the present invention are explained. However, in some cases, the mode is different between the period of the plug-in charging operation and the period of the contactless charging operation depending on the operating frequency of the switching elements or the load conditions.

Although in the charging device 101 of Example 2, the configuration of connecting the resonant inductors Lr1, Lr3 in series to the coils N1, N3 is adopted, it is also possible to use the leakage inductance of the coils N1, N3.

Further, the resonant capacitor Cr1 is connected in series to the coil N1, but can also be connected in parallel to the coil N1. It should be noted that in the case of connecting the resonant capacitor Cr1 in parallel to the coil N1, there is adopted a configuration of connecting the resonant inductor Lr1 in series to the coil N1 on the switching element side of the resonant capacitor Cr1 in order to prevent the short circuit between the direct-current link capacitor C11 and the resonant capacitor Cr1.

Further, although the resonant capacitor Cr3 is connected in series to the coil N3 in order to compensate the leakage inductance of the coil N3, and the resonant capacitor Cr2 is connected in parallel to the coil N2 in order to compensate the leakage inductance of the coil N2, even in the case of connecting the resonant capacitor Cr3 in parallel to the coil N3 and connecting the resonant capacitor Cr2 in series to the coil N2, the effect of compensating the leakage inductance can similarly be obtained.

According to Example 2, by adopting the full-bridge circuit to the DC-AC inverters 22, 24 and adopting the bridge rectifier circuit to the charging secondary circuit 107, it is possible to obtain the circuit configuration suitable to a high-voltage system such as an electric vehicle.

EXAMPLE 3

Figure 11:
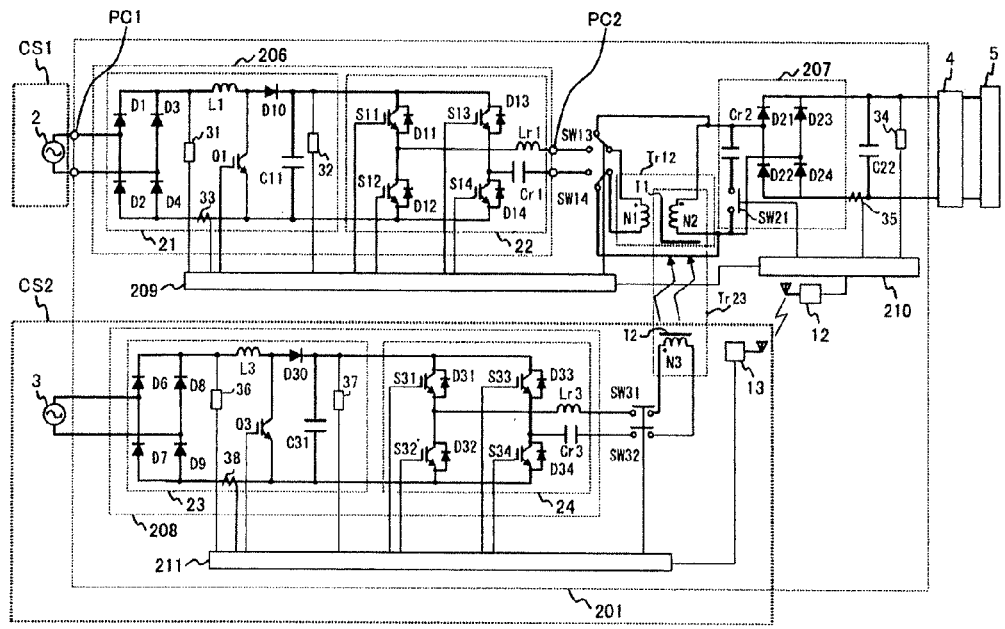
FIG. 11 is a specific circuit configuration diagram of a charging system according to Example 3 of the present invention.

FIG. 11 is a specific circuit configuration diagram of a secondary cell charging system according to Example 3 of the present invention. A charging device 201 is connected between the alternating-current power supply 2 and the alternating-current power supply 3, and the secondary cell 4, and is capable of charging the secondary cell 4 by the alternating-current power supply 2 using the plug-in charge, or by the alternating-current power supply 3 using the contactless charge.

The charging device 201 is basically the same as Example 2 shown in FIG. 8, and the parts duplicate with those explained with reference to FIG. 8 will be omitted from the explanation. For the plug-in charge in the first charging site CS1, there are provided a plug-in charging primary circuit 206, switches SW13, SW14, the isolation transformer Tr12 (the coils N1, N2), a charging secondary circuit 207, and the smoothing capacitor C22, and further provided control means 209, 210, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 206. It should be noted that similarly to Examples 1, 2, one provided with the plug-in charging primary circuit 206 in the first charging site CS1, and disposing the plug-in connector at the position indicated by the reference symbol PC2 shown in the drawing can also be adopted. The plug-in charging primary circuit 206 and the switches SW13, SW14 are controlled by the control means 209 and the control means 210 coordinating with each other.

On the other hand, the second charging site CS2 is provided for the contactless charge, and the second charging site CS2 is provided with the second power supply 3, a contactless charging primary circuit 208, the switches SW31, SW32, some parts (the core T2, the coil N3) of the isolation transformer Tr23, control means 211, and the transceiver 13.

Compared to the charging device 101 of Example 2 (FIG. 8), the charging device 201 is different in the point that the switches SW11, SW12 are replaced with the selector switches SW13, SW14, and the coil N1 and the coil N2 are arranged to be connectable in parallel to each other, and is the same as Example 2 in other points.

In the period of the contactless charging operation, by switching the switches SW13, SW14 to thereby separate the coil N1 from the DC-AC inverter 22, and connecting the coil N1 and the coil N2 in parallel to each other, it is possible to use the coil N1 as the secondary coil of the contactless charging transformer Tr23.

Thus, since the charging device 201 divides the current flowing through the coil N2 into those flowing through the coil N1 and the coil N2 in the period of the contactless charging operation to thereby reduce the current of the coil N2, reduction of the conduction loss can be achieved.

According to Example 3, by switching the connection of the coil N1 in the period of the contactless charging operation, improvement of the charging efficiency can be achieved.

EXAMPLE 4

Figure 12:
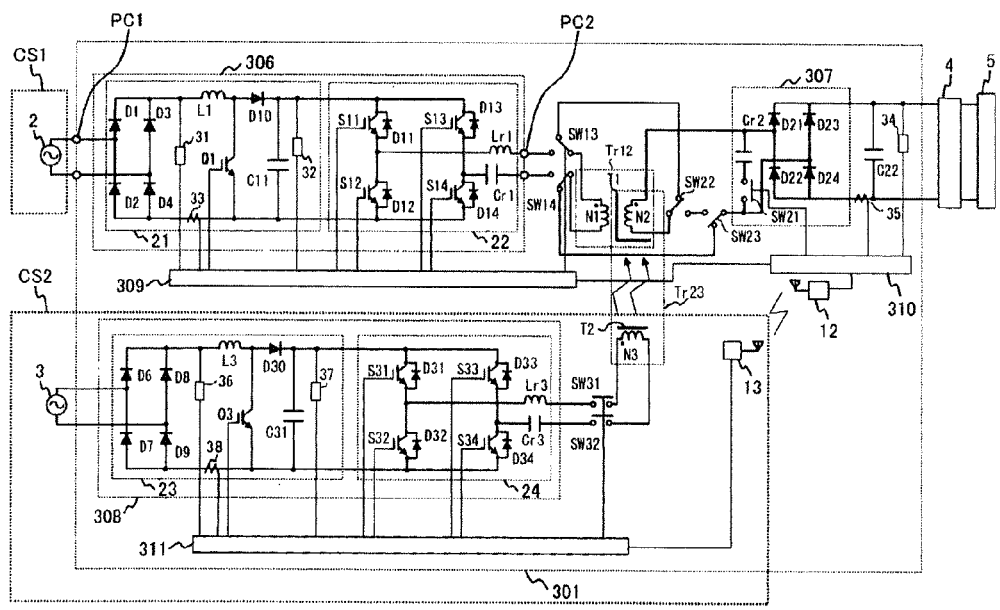
FIG. 12 is a specific circuit configuration diagram of a charging system according to Example 4 of the present invention.

FIG. 12 is a specific circuit configuration diagram of a secondary cell charging system according to Example 4 of the present invention. The charging device 301 is connected between the alternating-current power supply 2 and the alternating-current power supply 3, and the secondary cell 4, and is capable of charging the secondary cell 4 by the alternating-current power supply 2 using the plug-in charge, or by the alternating-current power supply 3 using the contactless charge.

The charging device 301 is basically the same as Example 2 shown in FIG. 8, and the parts duplicate with those explained with reference to FIG. 8 will be omitted from the explanation. For the plug-in charge in the first charging site CS1, there are provided a plug-in charging primary circuit 306, the switches SW13, SW14, the isolation transformer Tr12 (the coils N1, N2), switches SW22, SW23, a charging secondary circuit 307, and the smoothing capacitor C22, and further provided control means 309, 310, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 306. It should be noted that similarly to Examples 1 through 3, one provided with the plug-in charging primary circuit 306 in the first charging site CS1, and disposing the plug-in connector at the position indicated by the reference symbol PC2 shown in the drawing can also be adopted. The plug-in charging primary circuit 306 and the switches SW13, SW14 are controlled by the control means 209 and the control means 210 coordinating with each other.

On the other hand, the second charging site CS2 is provided for the contactless charge, and the second charging site CS2 is provided with the second power supply 3, a contactless charging primary circuit 308, the switches SW31, SW32, some parts (the core T2, the coil N3) of the isolation transformer Tr23, control means 309 through 311, and the transceiver 13.

Compared to the charging device 201 of Example 3 (FIG. 11), the charging device 301 is different in the point that the selector switches SW22, SW23 are newly disposed between the coil N2 and the charging secondary circuit 307.

According to the present example, in the period of the contactless charging operation, the switches SW13, SW14 are switched to thereby separate the coil N1 from the DC-AC inverter 22, and the switches SW22, SW23 are switched to thereby connect the coil N1 and the coil N2 in series to each other. Thus, the turn ratio of the contactless charging transformer Tr23 can be made variable, and by optimizing the turn ratio of the contactless charging transformer in accordance with the charging state, improvement of the charging efficiency can be achieved.

EXAMPLE 5

Figure 13:
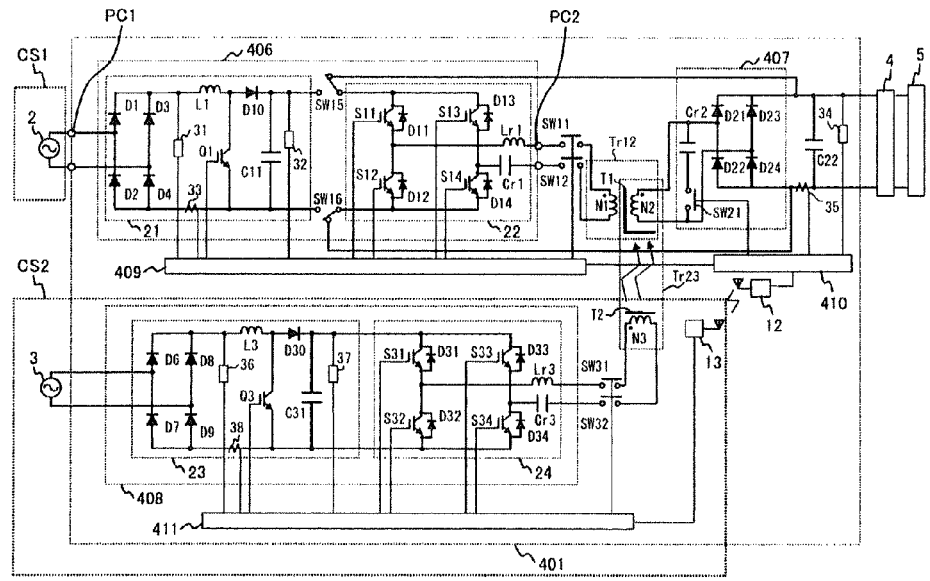
FIG. 13 is a specific circuit configuration diagram of a charging system according to Example 5 of the present invention.

FIG. 13 is a circuit configuration diagram of a secondary cell charging system according to Example 5 of the present invention. A charging device 401 is connected between the alternating-current power supply 2 and the alternating-current power supply 3, and the secondary cell 4, and is capable of charging the secondary cell 4 by the alternating-current power supply 2 using the plug-in charge, or by the alternating-current power supply 3 using the contactless charge.

The charging device 401 is basically the same as Example 2 shown in FIG. 8, and the parts duplicate with those explained with reference to FIG. 8 will be omitted from the explanation. For the plug-in charge in the first charging site CS1, there are provided a plug-in charging primary circuit 406, the switches SW11, SW12, the isolation transformer Tr12 (the coils N1, N2), a charging secondary circuit 407, and the smoothing capacitor C22, and further provided control means 409, 410, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 406. It should be noted that similarly to Examples 1 through 4, one provided with the plug-in charging primary circuit 406 in the first charging site CS1, and disposing the plug-in connector at the position indicated by the reference symbol PC2 shown in the drawing can also be adopted. The plug-in charging primary circuit 406 and the switches SW11, SW12 are controlled by the control means 409 and the control means 410 coordinating with each other.

On the other hand, the second charging site CS2 is provided for the contactless charge, and the second charging site CS2 is provided with the second power supply 3, a contactless charging primary circuit 408, the switches SW31, SW32, some parts (the core T2, the coil N3) of the isolation transformer Tr23, control means 411, and the transceiver 13.

Compared to the charging device 101 of Example 2 (FIG. 8), the charging device 401 is different in the point that selector switches SW15, SW16 are disposed between connection terminals of the AC-DC converter 21 and the DC-AC inverter 22 of the plug-in charging primary circuit 406.

In the charging device 401 of Example 5, a fast charging operation of additionally using the coil N1 and the DC-AC inverter 22, which are not conventionally used in the contactless charge, as the charging secondary circuit becomes possible. Hereinafter, the operation in the fast charge using the contactless charge will be explained.

(Fast Charging Operation)

When performing the fast charging operation using the contactless charge, the switches SW11, SW12 and the switches SW31, SW32 are kept in the ON state. By switching the switches SW15, SW16, the coil N1 and the DC-AC inverter 22 are separated from the AC-DC converter 21, and are connected in parallel to the smoothing capacitor C22 connected in parallel to the secondary cell 4.

Based on the information received from the control means 411, the control means 410 makes the contactless charging primary circuit 408 perform a switching operation to thereby apply an alternating-current voltage to the coil N3. Thus, the induction voltage generated in the coil N1 is rectified by the diodes D11 through D14 of the DC-AC inverter 22, and the secondary cell 4 is supplied with the electrical power. At the same time, the induction voltage generated in the coil N2 is also rectified by the charging secondary circuit 407, and the secondary cell 4 is supplied with the electrical power.

Hereinabove, in the charging device 401 of Example 5, in the period of the contactless charge, the power from the alternating-current power supply 3 can be supplied to the secondary cell 4 using also the DC-AC inverter 22 as the charging secondary circuit in addition to the charging secondary circuit 407.

Thus, the converter capacity of the charging secondary circuit can be increased to a large capacity, and by increasing the converter capacity of the contactless charging primary circuit 408 to the large capacity, reduction of the charging time can be achieved.

It should be noted that in the case in which the turn ratio α (N1/N2) between the coils N1 and N2 is in a range of α<1, by making the switching elements SW11 through SW14 of the AC-AC inverter 22 perform switching to thereby operate as a step-up chopper, the DC-AC inverter 22 and the charging secondary circuit 407 is used as a rectifier circuit, and thus, the electrical power from the alternating-current power supply can be supplied to the secondary cell 4.

According to Example 5, the plug-in charging circuit is used as the normal charging device, and thus, it is possible to obtain the charging system capable of using the contactless charging circuit as the fast charging device.

EXAMPLE 6

Figure 14:
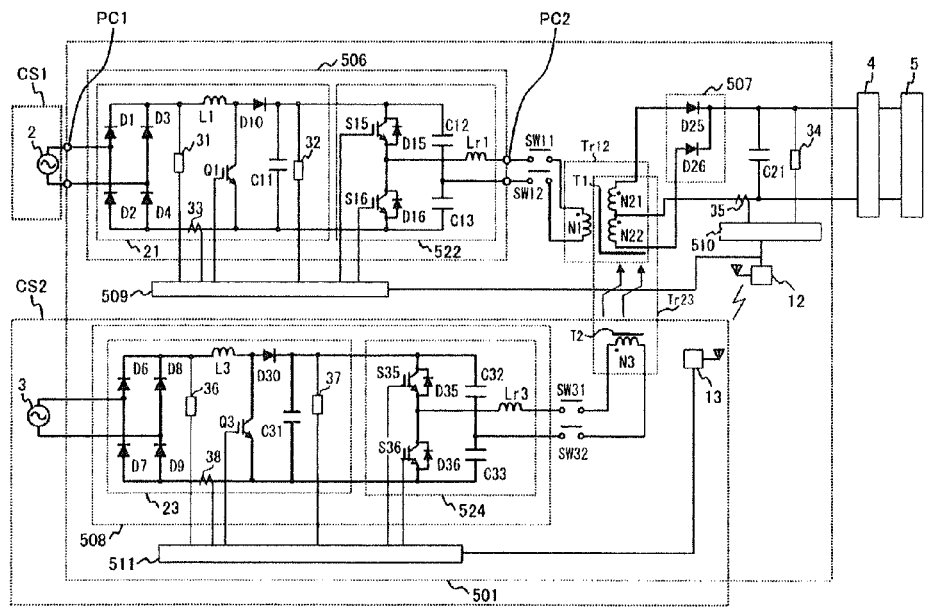
FIG. 14 is a specific circuit configuration diagram of a charging system according to Example 6 of the present invention.

FIG. 14 is a specific circuit configuration diagram of a secondary cell charging system according to Example 6 of the present invention. Similarly to the charging device 101 of Example 2 (FIG. 8), a charging device 501 is connected between the alternating-current power supply 2 and the alternating-current power supply 3, and the secondary cell 4, and is capable of charging the secondary cell 4 by the alternating-current power supply 2 using the plug-in charge, or by the alternating-current power supply 3 using the contactless charge.

The charging device 501 is basically the same as Example 2 shown in FIG. 8, and the parts duplicate with those explained with reference to FIG. 8 will be omitted from the explanation. For the plug-in charge in the first charging site CS1, there are provided a plug-in charging primary circuit 506, the switches SW11, SW12, the isolation transformer Tr12 (the coils N1, N21, and N22), a charging secondary circuit 507, and the smoothing capacitor C22, and further provided control means 509, 510, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 406. It should be noted that similarly to Examples 1 through 5, one provided with the plug-in charging primary circuit 506 in the first charging site CS1, and disposing the plug-in connector at the position indicated by the reference symbol PC2 shown in the drawing can also be adopted. The plug-in charging primary circuit 506 and the switches SW11, SW12 are controlled by the control means 509 and the control means 510 coordinating with each other.

On the other hand, the second charging site CS2 is provided for the contactless charge, and the second charging site CS2 is provided with the second power supply 3, a contactless charging primary circuit 508, the switches SW31, SW32, some parts (the core T2, the coil N3) of the isolation transformer Tr23, control means 511, and the transceiver 13.

Compared to the DC-AC inverter 22 of Example 2 (FIG. 8), in a DC-AC inverter 522, the resonant capacitor Cr1 is replaced with resonant capacitors C12, C13. Further, the DC-AC inverter 522 is different in the point that there is used a half-bridge circuit in which the switching elements S11 through S14 full-bridge-connected to each other are replaced with only single-arm switching elements S15, S16 (attached with diodes D15, D16).

Compared to the charging secondary circuit 107 of Example 2 (FIG. 8), a charging secondary circuit 507 is different in the point that the coil N2 is replaced with coils N21, N22, and the diodes D21 through D24 bridge-connected to each other are replaced with diodes D25, D26. The charging secondary circuit 507 is referred to as a center-tap rectifier circuit. In the center-tap rectifier circuit, one end of the coil N21 and one end of the coil N22 are connected to each other, the other end of the coil N21 is connected to one end of the diode D25, and the other end of the coil N22 is connected to one end of the diode D26. The other end of the diode D25 and the other end D26 are connected to one end of the smoothing capacitor C22. A connection point of the coils N21, N22 is connected to the other end of the smoothing capacitor C22.

Similarly to the plug-in charging primary circuit 506, the contactless charging primary circuit 508 has the DC-AC inverter 524 having the half-bridge configuration.

According to Example 6, the half-bridge circuit is adopted as the AC-AC converter primary circuits 506, 508, and the center-tap rectifier circuit is adopted as the charging secondary circuit 507, and thus, the number of components of the switching elements and the diodes can be reduced.

EXAMPLE 7

Figure 15:
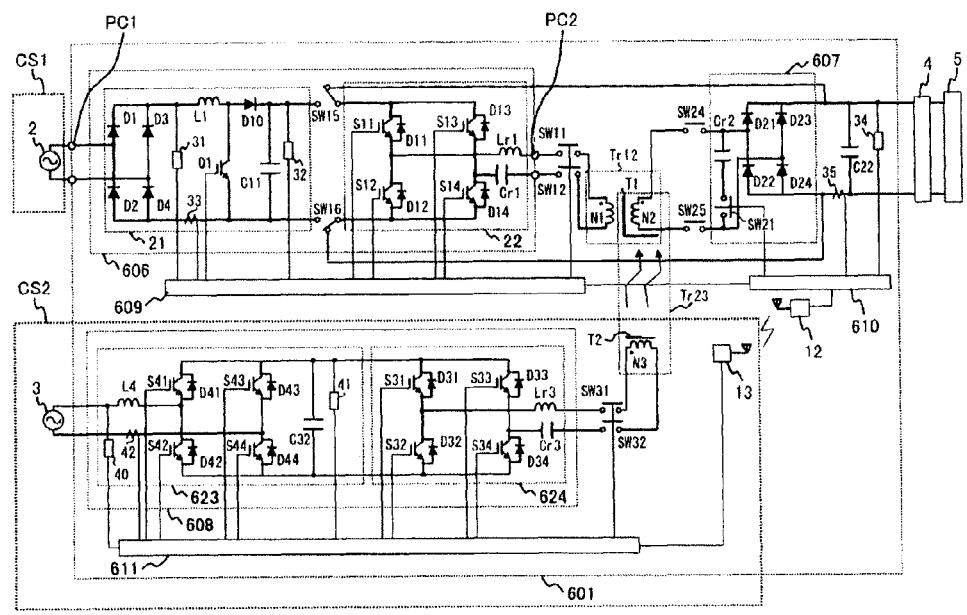
FIG. 15 is a specific circuit configuration diagram of a charging system according to Example 7 of the present invention.

FIG. 15 is a specific circuit configuration diagram of a secondary cell charging system according to Example 7 of the present invention. Similarly to the charging device 301 of Example 4 (FIG. 12), a charging device 601 is capable of charging the secondary cell 4 by the alternating-current power supply 2 using the plug-in charge, or by the alternating-current power supply 3 using the contactless charge.

The charging device 601 is the same as Example 5 shown in FIG. 13 except the circuit configuration in a contactless charging primary circuit 608, and the parts duplicate with those explained with reference to FIG. 13 will be omitted from the explanation. For the plug-in charge in the first charging site CS1, there are provided a plug-in charging primary circuit 606, the switches SW11, SW12, the isolation transformer Tr12 (the coils N1, N2), switches SW24, SW25, a charging secondary circuit 607, and the smoothing capacitor C22, and further provided control means 609, 610, and the transceiver 12. In the case of the electric vehicle, these circuits, the secondary cell 4, and the load 5 are mounted on the vehicle.

It is arranged that the plug-in connector PC1 can establish or block the connection between the power supply 2 constituting the first charging site CS1 and the plug-in charging primary circuit 606. It should be noted that similarly to Examples 1 through 6, one provided with the plug-in charging primary circuit 606 in the first charging site CS1, and disposing the plug-in connector at the position indicated by the reference symbol PC2 shown in the drawing can also be adopted. The plug-in charging primary circuit 606 and the switches SW11, SW12 are controlled by the control means 609 and the control means 610 coordinating with each other.

On the other hand, a second charging site CS2 is provided for the contactless charge, and the second charging site CS2 is provided with the contactless charging primary circuit 608, the switches SW31, SW32, some parts (the core T2, the coil N3) of the isolation transformer Tr23, control means 611, and the transceiver 13.

In the charging device 601, the AC-DC converter 23 in the contactless charging primary circuit 408 of Example 5 (FIG. 13) is replaced with a PWM converter 623 composed of a step-up inductor L4, switching elements S41 through S44, and a direct-current link capacitor C32. Further, the charging device 601 is different in the point that the switches SW24, SW25 are disposed between the charging secondary circuit 607 and the coil N2. To the switching elements S41 through S44 in the PWM converter 623, there are connected antiparallel diodes D41 through D44, respectively. The switching elements S41 through S44 are controlled by the control means 610 and the control means 611 coordinating with each other, and the switches SW24, SW25 are controlled by the control means 610.

To the control means 611, there are connected a voltage sensor 40 for detecting an input voltage, a voltage sensor 41 for detecting the link voltage, a current sensor 42 for detecting an input current from the alternating-current power supply, and the transceiver 13.

In Example 7, by making the PWM converter 623 and the DC-AC inverter 624 in the contactless charging primary circuit 608 perform the switching operation, and making the charging device 601 perform a bidirectional operation, it is possible to supply the alternating-current power supply 3 with the electrical power of the secondary cell 4. Hereinafter, the operation described above is referred to as a reverse power flow operation, and the reverse power flow operation will be explained.

(Reverse Power Flow Operation)

When performing the reverse power flow operation, the switches SW11, SW12 and the switches SW31, SW32 are kept in the ON state, and the switches SW24, SW25 are kept in the OFF state. Further, the switches SW15, SW16 are switched to thereby separate the coil N1 and the DC-AC inverter 22 from the alternating-current power supply 2 and the AC-DC converter 21, and connect the coil N1 and the DC-AC inverter 22 in parallel to both ends of the smoothing capacitor C22. The DC-AC inverter 22 is made to perform the switching operation using the control means 610 and the control means 611 to thereby apply an alternating-current voltage to the coil N1. The diodes D31 through D34 of the DC-AC inverter 624 rectify the induction voltage generated in the coil N2, and then supply it to the direct-current link capacitor C32. The PWM converter 623 is made to perform the switching operation using the control means 611 to thereby supply the alternating-current power supply 3 with the electrical power of the direct-current link capacitor C32.

Although in Example 7, a single-phase input of the charging device is assumed, application to a three-phase input is also possible by changing the PWM converter to a three-phase type.

As described above, according to Example 7, the charging system can be made as a system for exporting the electrical power of the secondary cell 4 back to the alternating-current power supply 3.

EXAMPLE 8

Figure 16:
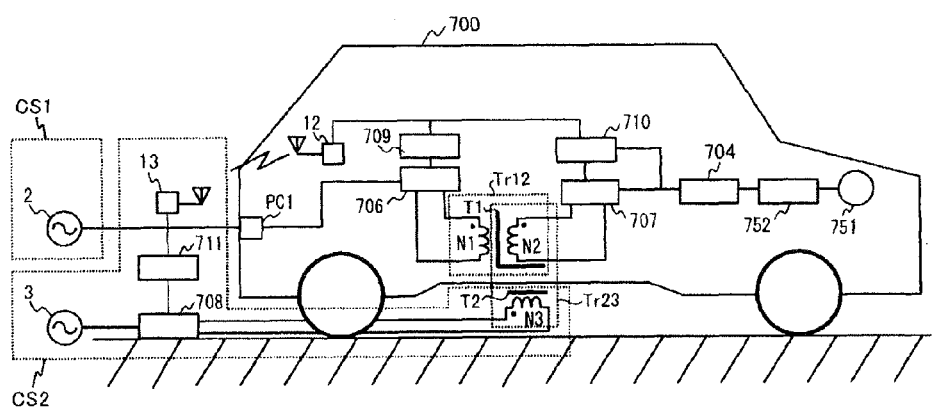
FIG. 16 is a schematic configuration diagram of a charging system obtained by applying the present invention to an electric vehicle.

FIG. 16 is a schematic configuration diagram of a charging system of an electric vehicle 700 adopting the charging system according to the present invention.

The electric vehicle 700 converts the electrical power of a secondary cell 704 into a three-phase alternating current with variable voltage/variable frequency using an inverter 752, and then supplies it to a power motor 751. It is necessary to charge the secondary cell 704, and for the plug-in charge in the first charging site CS1 equipped with the first power supply 2, there are provided a plug-in charging primary circuit 706 connected to the plug-in connector PC1, the isolation transformer Tr12 (the coils N1, N2), and a charging secondary circuit 707, and further provided control means 709, 710, and the transceiver 12.

On the other hand, the second charging site CS2 is provided for the contactless charge, and the second charging site CS2 is provided with the second power supply 3, a contactless charging primary circuit 708, some parts (the core T2, the coil N3) of the isolation transformer Tr23, control means 711, and the transceiver 13.

The contactless charging primary circuit 708 is controlled by the control means 711. The control means 710 and the control means 711 are wirelessly connected to each other by the transceiver 12 mounted on the vehicle and the transceiver 13 of the second charging site CS2.

When the electric vehicle 700 is parked at a predetermined position in the second charging site CS2, the isolation transformer Tr23 establishes the magnetic coupling between the coil N3 on the charging site CS2 side and the coil N2 mounted on the vehicle using the cores T1, T2 to make it possible to transmit the power for the contactless charge from the coil N3 to the coil N2.

According to the present example, it is possible to cope with the plug-in charge and the contactless charge with a single isolation transformer, and to use the posterior components of the secondary section of the isolation transformer in common, and therefore, miniaturization and weight saving of the charging device can be achieved.

It is obvious that the charging device 1 according to the present invention can also be applied to a hybrid vehicle.

EXAMPLE 9

Figure 17:
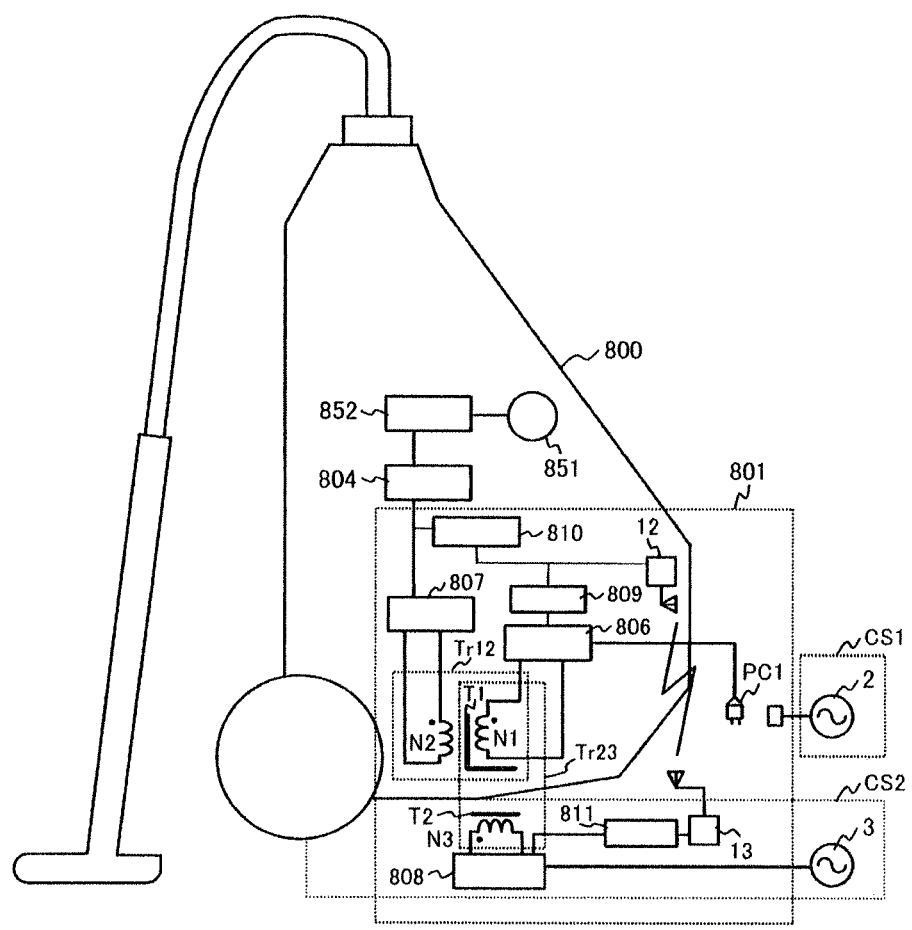
FIG. 17 is a schematic configuration diagram of a charging system obtained by applying the present invention to an electric vacuum cleaner.

FIG. 17 is a schematic configuration diagram of a charging system of an electric vacuum cleaner 800 adopting the charging system according to the present invention. A charging device 801 is connected to a secondary cell 804 for supplying an inverter 852 for driving a power motor 851 with electricity, a plug-in charging connector 853, and an alternating-current power supply 802. When performing the plug-in charge, the electrical power of the alternating power supply 802 connected to the plug-in charging connector 853 is supplied to the secondary cell 804 via a plug-in charging primary circuit 806, the isolation transformer Tr12 (the coil N1, the coil N2), and a charging secondary circuit 807.

When performing the contactless charging operation, supply is performed from the alternating-current power supply 802 to the secondary cell 804 via a contactless charging primary circuit 808, the isolation transformer Tr23 (the core T2, the coils N3, N2), and the charging secondary circuit 807.

According to the present example, it is possible to cope with the plug-in charge and the contactless charge with a single isolation transformer, and to use the posterior components of the secondary section of the isolation transformer in common, and therefore, miniaturization and weight saving of the charging device can be achieved.

It is obvious that the charging system according to the present invention can also be applied to stationary equipment such as a television set or a personal computer, and portable equipment such as a cellular phone.

INDUSTRIAL APPLICABILITY

The present invention can be applied to an electronic system used in an electric vehicle, a charging device for a carrier device in a factory, a charging device used for portable equipment, and so on.

REFERENCE SIGNS LIST 1, 101, 201, 301, 401, 501, 601, 801 charging device
2, 3, 702, 802 power supply
4 secondary cell
5 load
6, 106, 206, 306, 406, 506, 606, 706, 806 plug-in charging primary circuit
7, 107, 207, 307, 407, 507, 607, 707, 807 charging secondary circuit
8, 108, 208, 308, 408, 508, 608, 708, 808 contactless charging primary circuit
9, 10, 11, 109, 110, 111, 209, 210, 211, 309, 310, 311, 409, 410, 411, 509, 510, 511, 609, 610, 611, 709, 710, 711, 809, 810, 811 control means
12, 13 transceiver
14, 16, 17 magnetic core
15 insulating member
21, 23, 623 AC-DC converter
22, 24, 522, 524 DC-AC inverter
751, 851 motor
752, 852 inverter
PC1, PC2 plug-in connector
N1, N2, N3 coil of an isolation transformer
T1, T2 magnetic core of an isolation transformer
Tr12 isolation transformer for plug-in charge
Tr23 isolation transformer for contactless charge

The invention claimed is:

1. A charging system comprising:
a first coil of a transformer supplied with electrical power from a first power supply via a wired connector;
a second coil of the transformer magnetically coupled to the first coil;
one of a secondary cell and a capacitor to be charged by electrical power supplied to the second coil; and
a third coil, which is supplied with electrical power from a second power supply, a relative position of which to the second coil is variable, and which can be magnetically coupled to the second coil when the second coil approaches to the third coil,
wherein in a case of charging one of the secondary cell and the capacitor by the first power supply, the charging power is supplied to one of the secondary cell and the capacitor via the magnetic coupling between the first coil and the second coil, and
in a case of charging one of the secondary cell and the capacitor by the second power supply, the charging power is supplied to one of the secondary cell and the capacitor via the magnetic coupling between the third coil and the second coil.

2. The charging system according to claim 1 further comprising:
an AC-AC converter connected between the first power supply and the first coil of the transformer,
wherein the wired connector is disposed so as to one of establish and block connection between the first power supply and the AC-AC converter.

3. The charging system according to claim 1 further comprising:
an AC-AC converter connected between the first power supply and the first coil of the transformer,
wherein the wired connector is disposed so as to establish and block connection between the AC-AC converter and the first coil.

4. The charging system according to claim 1 wherein
an AC-AC converter is connected between the second power supply and the third coil.

5. The charging system according to claim 2 wherein
the AC-AC converter is provided with a rectifier circuit, a chopper circuit, and an inverter circuit.

6. The charging system according to claim 1 wherein
the transformer including the first and second coils, and one of the secondary cell and the capacitor are mounted on a vehicle,
the first power supply adapted to supply the first coil with the electrical power is disposed in a first charging site on a ground,
the second power supply and the third coil are disposed in a second charging site on the ground, and
the charging system is configured so that the connection between the first power supply and the first coil can be established using the wired connector in a case in which the vehicle stops at a predetermined position in the first charging site, and the third coil and the second coil can be magnetically coupled to each other in a case in which the vehicle stops at a predetermined position in the second charging site.

7. The charging system according to claim 1 wherein
the transformer is provided with a first magnetic core, which has a columnar leg disposed in a central portion and a leg disposed in a peripheral portion, around which the first and second coils are wound, and which has a shape having a recess shaped like a doughnut inside viewed from an opening section, and a second magnetic core, around which the third coil is wound, and which has a leg disposed in a peripheral portion.

8. The charging system according to claim 1 wherein
the transformer is provided with a first magnetic core, which has a columnar leg having a recess at a center, disposed in a central portion and a leg disposed in a peripheral portion, around which the first and second coils are wound, and which has a shape having a recess shaped like a doughnut inside viewed from an opening section, and a second magnetic core, which has a flat shape, around which the third coil is wound.

9. The charging system according to claim 1 wherein
the transformer is provided with a first magnetic core, which has a flat shape, and around which the first and second coils are wound, and a second magnetic core, which has a flat shape, and around which the third coil is wound.

10. The charging system according to claim 7 further comprising:
a first transceiver disposed to the first magnetic core; and
a second transceiver disposed to the second magnetic core,
wherein the first transceiver transmits a control command adapted to control the third circuit based on the charging state of the secondary cell to the second transceiver.

11. The charging system according to claim 7 wherein
a thickness of an insulating member covering the first and second coils is different between the first and second coils.

12. A charging system comprising:

a first circuit connected to a first power supply;

a first coil of a transformer connected to the first circuit;

a second coil of the transformer to be magnetically coupled to the first coil;

a second circuit adapted to supply electrical power, which is supplied to the second coil, in order to charge one of a secondary cell and a capacitor;

a third circuit connected to a second power supply; and a third coil, which is supplied with electrical power from the second power supply via the third circuit, a relative position of which to the second coil is variable, and which can be magnetically coupled to the second coil when the second coil approaches to the third coil, wherein in a case of charging one of the secondary cell and the capacitor by the first power supply, the charging power is supplied from the first circuit to one of the secondary cell and the capacitor via the first and second coils and the second circuit, and in a case of charging one of the secondary cell and the capacitor by the second power supply, the charging power is supplied from the third circuit to one of the secondary cell and the capacitor via the third and second coils and the second circuit.

13. The charging system according to claim 12 further comprising:

a switch disposed between the first circuit and the first coil, and adapted to separate the first coil from the first circuit and connect the first coil in parallel to the second coil, wherein in a case of charging the secondary cell by the second power supply, the first coil and the second coil are connected in parallel to each other using the switch.

14. The charging system according to claim 12 further comprising:

a switch disposed between the first circuit and the first coil, and adapted to separate the first coil from the first circuit; and a switch disposed between the second coil and the second circuit, and adapted to connect the first coil and the second coil in series to each other, wherein in a case of supplying electrical power from the second power supply to a load, the first coil and the second coil are connected in series to each other.

15. The secondary cell charging system according to claim 12 wherein at least one of the first circuit and the third circuit is an AC-AC converter including a rectifier circuit, a chopper circuit, and an inverter circuit.

16. The charging system according to claim 15 wherein the chopper circuit includes a series circuit of a step-up inductor and a step-up switching element connected between direct-current terminals, and a series circuit of a step-up diode and an output capacitor connected between both terminals of the step-up switching element.

17. The charging system according to claim 12 wherein one of the first and third circuits includes a step-up inductor connected to one of the first and second power supply, a PWM converter circuit having switching elements, to which diodes are respectively connected in parallel, and which are bridge-connected to each other, and a capacitor adapted to smooth an output of the PWM converter.

18. The charging system according to claim 12 wherein a full-bridge inverter circuit having switching elements, to which diodes are respectively connected in parallel, and which are bridge-connected to each other, is used as the inverter circuit, and a bridge rectifier circuit having diodes bridge-connected to each other is used as the second circuit.

19. The charging system according to claim 12 wherein the second circuit includes a first transceiver, the third circuit includes a second transceiver communicating with the first transceiver, and the first transceiver transmits a control command adapted to control the third circuit based on the charging state of the secondary cell to the second transceiver.

20. A vehicle including by mounting the first coil and the second coil of the transformer, the second circuit, and one of the secondary cell and the capacitor according to claim 12.

21. A ground contactless charging site including by installing:

the second power supply, the third circuit, and the third coil according to claim 12.

22. An electric vacuum cleaner including:

the first circuit, the first coil and the second coil of the transformer, the second circuit, and at least one of the secondary cell and the capacitor according to claim 12.

\* \* \* \* \*